United States Patent

Insolio et al.

[15] 3,682,027
[45] Aug. 8, 1972

[54] GLASS CUTTER

[72] Inventors: Thomas A. Insolio; Richard M. Guzowski, both of Bristol; Robert A. Steinkamp, Middletown, all of Conn.

[73] Assignee: The Fletcher-Terry Company, Forestville, Conn.

[22] Filed: Dec. 21, 1970

[21] Appl. No.: 100,161

[52] U.S. Cl. .................83/12, 30/164.95, 83/481, 83/676, 83/698
[51] Int. Cl. .........................................B26d 3/08
[58] Field of Search...............83/12, 698, 481, 676; 30/164.95, 307; 225/2, 96, 96.5

[56] References Cited

UNITED STATES PATENTS

| 636,997 | 11/1899 | Huson | 83/481 X |
|---|---|---|---|
| 1,184,853 | 5/1916 | Hobbs | 83/481 X |
| 2,096,284 | 10/1937 | Lee | 30/164.95 |
| 3,461,755 | 8/1969 | Gerew et al. | 83/12 |
| 3,570,336 | 3/1971 | Galla | 83/12 |

*Primary Examiner*—Frank T. Yost
*Attorney*—McCormick, Paulding & Huber

[57] ABSTRACT

Two constructions for a glass cutter are disclosed, and each comprises an insert with an axle for rotatably supporting a glass cutting wheel, a holder having a slot for removably receiving the insert. The holder is mounted to a cutting head of the type used for traversing a glass sheet, and the holder slot opens downwardly and forwardly for receiving the insert. In one version the insert has an inclined cam slot for receiving a pin in the holder, which pin extends across the holder slot to wedge the insert in place. In the other version the insert carries the pin, and the holder defines the cam slot for achieving the same end result.

6 Claims, 8 Drawing Figures

PATENTED AUG 8 1972　3,682,027

INVENTORS
THOMAS A. INSOLIO
RICHARD M. GUZOWSKI
ROBERT A. STEINKAMP

BY *McCormick, Paulding & Huber*
ATTORNEYS

GLASS CUTTER

BACKGROUND OF INVENTION

Prior art glass cutter inserts usually take advantage of a conventional bayonet type connection for removably mounting the insert in a holder provided in a glass-cutting head, and although other designs have been proposed in order to obviate some of the disadvantages associated with such a bayonet type joint none of these has avoided the problem of having to raise the glass cutting head and the holder some distance above the surface of the glass in order to remove and replace a pillar post or holder. Most prior art designs call for removing the insert by moving it downwardly from its associated opening in the holder. For example, in U.S. Pat. No. 2,096,284 issued to Lee there is disclosed a glass cutter comprising a glass cutting wheel on an axle, a post having a slot in which part of the wheel is disposed, and a removable retainer having an axle holding part, and a part seatable in a socket in the post. The retainer comprises a Y-shaped spring the stem or trunk of which is positioned in the socket of the post and the arms of which are slotted for receiving the axle. The stem is received in a slot in the post and bears against the sides of the slot to frictionally hold the retainer and thereby maintain the axle with the glass cutter wheel in position in the post slot. The retainer or insert must be downwardly removed from its associated slot in this construction.

In U.S. Pat. No. 3,461,755 issued to Gerew et al. the retainer or insert comprises a cylindrical plug which is adapted to be received in a cylindrical bore in the holder so as to be downwardly removable for replacement or repair. However, hereagain the holder must be raised up above the surface of the glass a distance at least as great as the axial length of the insert or plug in order to permit its removal.

It is an important aim of the present invention to provide an insert and holder so designed as to permit lateral removal of the insert from the holder, that is to provide a unique design which does not require the substantial vertical upward movement of the cutting head and holder prior to removal of the insert characteristic of prior art designs.

SUMMARY OF INVENTION

This invention relates to glasscutters, and deals more particularly with a holder and associated insert for use in a horizontally movable glass cutting head, which holder and insert are so designed that the insert can be removed generally horizontally or laterally without raising the head more than a slight distance above the surface of the glass, and more specifically so that the cutting head and holder need not be raised a distance corresponding to the vertical height of the insert.

The primary object of the present invention then is to provide a glass cutter having a readily removable insert to permit replacement or repair of the cutting tool, or wheel, carried by the insert without the necessity for elevating the cutting head and associated insert holder anymore than a slight distance above the surface of the glass to be scored.

In the preferred embodiments to be described herein, a holder is shown with a downwardly and forwardly open slot for receiving a generally rectangular insert, which insert carries a conventional cutting wheel on an associated axle. In one version the holder slot has a pin extending laterally thereacross so as to be received in a rearwardly open cam slot in the insert with the result that the insert is wedged in place for scoring or cutting the glass sheet as the holder and head are moved in a forward direction. In the other version the holder defines a forwardly open cam slot and the insert carries a locking pin which is adapted to be wedged in this cam slot for cutting in the forward direction.

DETAILED DESCRIPTION OF THE FIRST PREFERRED EMBODIMENT

Figure 1:
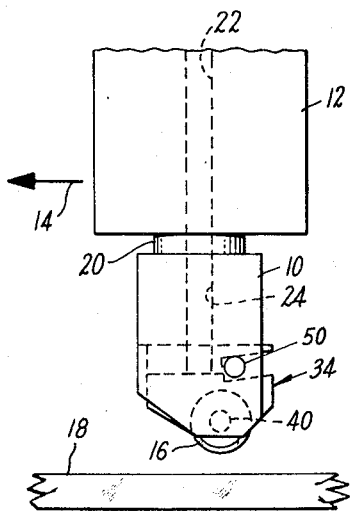
FIG. 1 shows in a side elevational view a first version of the present invention mounted in a slightly raised condition with respect to the surface of the glass sheet to be scored.

Turning now to the drawing in greater detail, FIGS. 1 thru 4 illustrate a presently preferred embodiment of the present invention, and illustrate a glass cutter comprising a holder member 10 mounted in a conventional glass cutting head 12 for use in a conventional glass cutting machine (not shown) of the type which is adapted to traverse the cutting head 12 in a horizontal direction, for example in the direction of the arrow 14, so that a rotary cutting wheel 16 is adapted to score or cut the surface 18 of a glass sheet for subsequent breaking. The holder member 10 comprises a pillar post 20 which is insertable into a conventional bearing or caster mounting (not shown) in the head 12 so that the forward direction 14 can be varied within predetermined limits in order to score the glass sheet surface 18 in other than a straight line. The cutting head 12 defines an internal passageway 22 which communicates with an aligned passageway 24 in the holder 10 so as to permit oil or other lubricant to reach the cutting wheel 16 carried by an insert 34 to be described.

Figure 2:
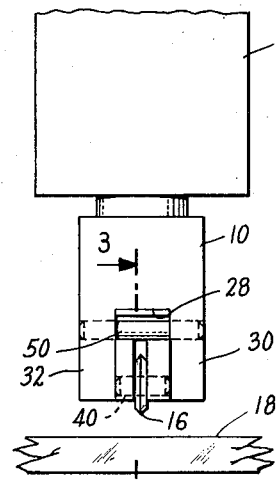
FIG. 2 shows the version of FIG. 1 from the rear, that is looking in the forward direction.
Figure 3:
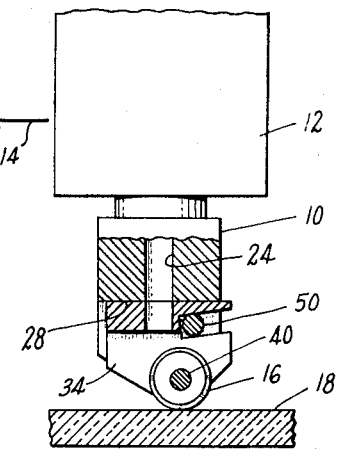
FIG. 3 is a vertical sectional view taken on the line 3—3 of FIG. 2.

Considering next FIGS. 2 and 3 in greater detail, the holder member 10 can be seen from these views to define a downwardly open slot 26 of rectangular shape which is open in a forward direction, and is also open in a rearward direction, and which defines an upper surface 28 disposed generally parallel to the surface 18 of the glass sheet to be scored, and which is oriented generally horizontally, provided of course that the glass sheet itself is so oriented in the particular machine to which the cutting head 12 is attached. This rectangular slot 26 is defined by two depending bifurcations 30 and 32 of the holder 10 so as to slidably receive the generally rectangular insert 34 best shown in FIG. 4, which insert 34 is so shaped as to be snugly received in the slot 26, and which has an upper surface 36 adapted to engage the upper surface 28 of the rectangular slot 26 in the holder 10 as best shown in FIGS. 2 and 3. When so assembled with the holder the insert member 34 can be seen from FIG. 3 to have a bore 38 which is aligned with the bore 24 in the holder 10 in order to provide a continuous passageway for the lubricant to the cutting wheel 16. The insert 34 has a bifurcated lower portion defining a downwardly open slot 43 which is provided in communication with the bore 38. An axle 40 extends across the slot 43 to receive the cutting wheel 16, in a conventional manner. As is conventional practice the end portions of the axle 40 are adapted to be fixed in the depending portions 42 and 44 of the insert 34, with the cutting wheel 16 being rotatably mounted upon an intermediate portion of the axle 40.

Figure 4:
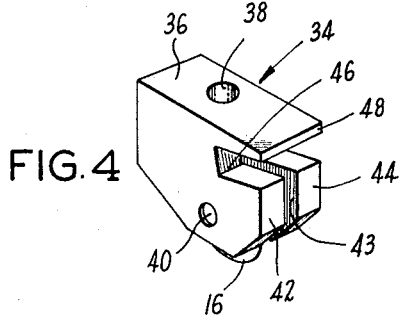
FIG. 4 is a perspective view showing the insert used in the glass cutter version depicted in FIG. 1 thru 3 inclusively.

The insert member 34 shown in FIG. 4 can be seen to have a rearwardly open inclined cam slot 46, which cam slot cooperates with the upper surface 36 of the insert member 34 to define a rearwardly projecting wedge shaped portion 48 of the insert member 34 for a purpose to be described. As best shown in FIG. 3, a locking pin 50 is provided in the holder member 10 and extends across the generally rectangularly shaped holder slot 26 a predetermined distance below the upper surface 28 of said slot and with its end portions mounted in the bifurcations 30 and 32 of the holder member 10 so as to define a receptacle for receiving the wedge shaped portion 48 of the insert member 34.

As so constructed and arranged, it will be apparent that the generally rectangularly shaped insert member 34 can be assembled with its associated holder 10 by merely moving the insert member laterally or horizontally in a rearward direction, with respect to the forward direction 14 of the cutting head, so as to wedge the insert member 34 in its assembled position. No other fastening or attaching means need be utilized in the construction shown, the friction provided between the locking pin 50 and the upper surface of the cam slot 46 serving to hold the insert member in position for scoring a glass sheet as shown in FIG. 3. In a conventional cutting machine, the head 12 is adapted to traverse the glass sheet so that the cutting wheel 16 scores the glass 18 as the head is moved in the direction of the arrow 14. When the cutting head 12 is to be returned for a succeeding pass on the same or another sheet of glass 18 the head 12 is raised slightly as indicated in FIGS. 1 and 2 for this return stroke.

It will be apparent from the foregoing description that the insert member 34 can be conveniently removed from its associated holder 10 by raising the cutting head so that the wheel 16 is slightly above the surface of the glass sheet 18 as shown in these views. Thus, the trouble and inconvenience caused by the necessity for raising the cutting head 12 above the surface of the glass sheet 18 a distance corresponding approximately to the vertical height of the insert 34 is avoided by the construction described herein.

DETAILED DESCRIPTION OF THE SECOND PREFERRED EMBODIMENT

Figure 5:
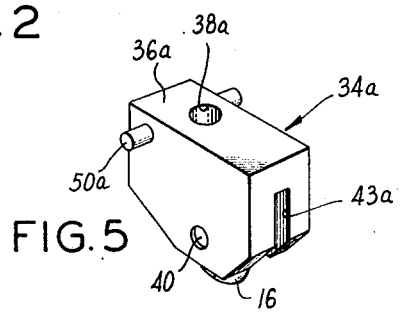
FIG. 5 shows an insert of alternative construction being a second version of the insert shown in FIGS. 1 thru 4 for use in a holder of the type shown in FIGS. 6 thru 8.
Figure 6:
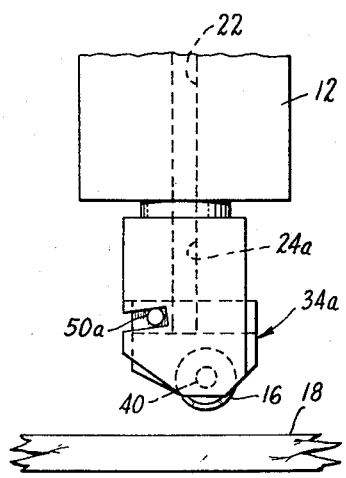
FIGS. 6, 7 and 8 show the holder for the FIG. 5 insert and correspond to FIGS. 1 thru 3 respectively.
Figure 7:
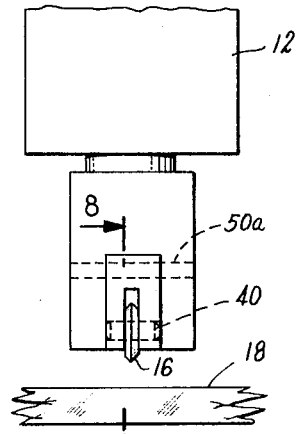
Figure 8:
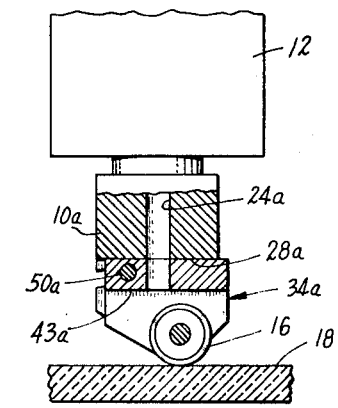

FIGS. 5, 6, 7 and 8 show an alternative construction embodying the invention residing in the previously described embodiment, and corresponding parts have been given corresponding reference numerals with the subscript "a" being added to distinguish them from the parts described with reference to the previously described embodiment of the present invention. More particularly, FIG. 5 shows a generally rectangularly shaped insert 34a having a cutting wheel 16 mounted on an axle 40 so as to rotate in a slot 43 provided for this purpose in the insert. A small bore 38a is provided in the insert and communicates with a suitable passageway for delivering oil or other lubricant to the cutting wheel 16 during the scoring of glass sheet in a cutting machine. The rectangular insert 34a also has an upper surface 36a which is adapted to engage an upper surface 28a of the holder 10a in the manner described hereinabove with respect to the previously described embodiment of the present invention. Whereas the previously described version employed an inclined cam slot 46 defined in the insert, and the locking pin 50 was defined in the holder 10, these parts have been reversed in the second preferred embodiment, and the locking pin 50a can be seen from FIG. 5 to have protruding end portions which are adapted to be received in the inclined cam slot 36a defined for this purpose in the holder member 10a. In order to prevent removal and replacement of the rectangular insert 34a in the same direction as in the previous embodiment, that is in order to permit its removal in a forward direction so that the force exerted thereupon during use in a cutting machine is exerted in the opposite direction, the cam slot 46a defined in the holder 10a is a forwardly open one rather than being rearwardly open as was the case with the cam slot 46 defined in the rectangular insert 34 shown in FIG. 4.

To summarize the advantage of the previously described embodiments, in virtually all cutting machines the cutting wheel must be retracted from the surface of the glass to provide clearance for return movement of the head. In the prior art machines this retracted height is usually great enough to also allow for downward removal of the insert. However with an insert of the type described and claimed herein this retracted height is kept to a minimum due to the unique design of holder and insert permitting lateral removal of the insert. The importance of minimizing this retracted height cannot be overemphasized. To contact the glass for a cut the wheel must be dropped onto it, and the impact can become high enough to damage the glass and/or the cutting wheel if this height is excessive. Minimizing this "retracted height", then minimizes the likelihood of this damage.

We claim:

1. A glasscutter for use in a glasscutting machine having a head adapted to traverse a sheet in a forward direction and comprising a depending holder member fixed in the head, said holder member defining a downwardly and forwardly open slot therein, an insert member having an upper surface and being slidably received in said slot so that said surface engages an upper surface of said holder member slot, a glass engageable tool carried by said insert member for scoring the glass sheet, one of said members having a cam slot defined therein, which cam slot is inclined slightly with respect to the interface defined by said coengaging member surfaces, and the other of said members having projecting means for fitting in said inclined cam slot to wedge said insert member upwardly against said holder member as said insert is moved generally rearwardly into said slot in said holder member during assembly.

2. The combination defined in claim 1 wherein said inclined cam slot is defined in said insert member and wherein said cam slot opens rearwardly to receive said projecting means, said projecting means comprising a locking pin mounted in said holder member, said pin extending laterally across said slot in said holder member to cooperate with said upper surface of said slot to define a receptacle of predetermined vertical height, said cam slot cooperating with the upper surface of said insert member to define a rearwardly projecting wedge to urge the insert member upwardly against the holder member during assembly.

3. The combination defined in claim 1 wherein said inclined cam slot is defined in said holder member and wherein said cam slot opens forwardly to receive said projecting means, said projecting means comprising a locking pin mounted in said insert member, said pin having opposite end portions which extend laterally outwardly to cooperate with said upper surface of said insert to define a predetermined vertical height, said cam slot cooperating with the upper surface of said slot in said holder member to define a forwardly projecting wedge shaped receptacle for receiving said insert member and urging it upwardly against said holder member during assembly.

4. A glasscutter for use in a glasscutting machine having a head adapted to horizontally traverse a sheet in a forward direction and comprising a depending holder fixed in the head and defining a downwardly and forwardly open slot of generally rectangular configuration with an upper horizontal surface and parallel side surfaces, an insert having an upper surface and having opposite sides defining a rectangular shape adapted to be slidably received in said holder slot, said insert having a glass engageable tool at its lower end for scoring a glass sheet, and downwardly inclined cam slot and locking pin means defined in part in said holder and in part in said insert and cooperating with said mating upper horizontal surfaces of said holder slot and insert respectively to permit assembly of said insert with said holder only by sliding said insert generally horizontally and rearwardly into said holder slot whereby said cam slot and said locking pin means serve to frictionally hold said insert in an assembled position in said holder.

5. The combination defined in claim 4 wherein said inclined cam slot and locking pin means comprise a rearwardly open cam slot of rectangular configuration defined in said insert and a pin extending across said holder slot with its end portions mounted to said holder to define a receptacle for receiving a wedge shaped portion of said insert defined by the upper surface of the insert and the inclined upper surface of said cam slot.

6. The combination defined in claim 4 wherein said inclined cam slot and locking pin means comprise a forwardly open cam slot of rectangular configuration defined in said holder and a pin carried by said insert and having projecting end portions receivable in said cam slot whereby said pin engages the lower surface of said inclined cam slot during assembly to urge the insert upwardly against the upper surface of said holder slot.

* * * * *